United States Patent
Lee

[11] Patent Number: 5,833,164
[45] Date of Patent: Nov. 10, 1998

[54] TAPE REEL DRIVING DEVICE

[75] Inventor: Hwan-seung Lee, Suwon, Japan

[73] Assignee: Samsung Electronics Co., Ltd., Kyungki-Do, Japan

[21] Appl. No.: 769,673

[22] Filed: Dec. 19, 1996

[30] Foreign Application Priority Data

Jul. 27, 1996 [KR]  Rep. of Korea ...................... 96-30889

[51] Int. Cl.⁶ .................................................. G11B 15/32
[52] U.S. Cl. ...................................................... 242/356.5
[58] Field of Search ............................ 242/356.3, 356.4, 242/356.5, 356.6, 356.7; 360/96.3, 96.4

[56] References Cited

U.S. PATENT DOCUMENTS

| | | | |
|---|---|---|---|
| 4,260,120 | 4/1981 | Urata et al. | 242/356.5 |
| 4,594,624 | 6/1986 | Kanchiku et al. | 224/356.5 |
| 4,819,891 | 4/1989 | Kamijo | 242/356.5 |
| 5,070,422 | 12/1991 | Sasaki et al. | 360/96.3 |
| 5,230,483 | 7/1993 | Kang . | |
| 5,251,845 | 10/1993 | Ryu . | |
| 5,295,638 | 3/1994 | Lee | 242/356 |
| 5,641,130 | 6/1997 | Weisser | 242/356.5 |

Primary Examiner—John P. Darling
Attorney, Agent, or Firm—Sughrue, Mion, Zinn, Macpeak & Seas, PLLC

[57] ABSTRACT

A tape reel driving device for generating torques for high and low speed tape travel, has first reel gears respectively combined with the reel driving tables so that each of the first reel gears and a corresponding one of the reel driving tables rotate together, and second reel gears respectively combined with the reel driving tables so that each of the second reel gears rotates by a predetermined frictional force together with a corresponding one of the reel driving tables, each of the second reel gears being capable of racing. A first idler is movably supported to be selectively connected to either one of the first reel gears of the pair of reel driving tables, and a second idler is movably supported to be selectively connected to either one of the second reel gears of the pair of reel driving tables. A movement preventing device for allowing the movement of one of the first and second idlers while preventing the other from moving, a motor for generating power, and a driving gear member which is rotated by the motor and which selectively drives the first and second reel gears through one of the first and second idlers are also provided.

14 Claims, 5 Drawing Sheets

TAPE REEL DRIVING DEVICE

BACKGROUND OF THE INVENTION

The present invention relates to a tape reel driving device for a tape recorder and, more particularly, to a tape reel driving device for driving a tape reel with varying torques according to a tape transfer speed.

A deck mechanism having a tape reel driving device as shown in FIG. 1 is provided in, for example, a video cassette tape recorder or a camcorder. Such a deck mechanism, on which a tape cassette 1 is loaded, is comprised of reel driving tables 5 and 6 for placing a pair of reels 2 and 3 of the tape cassette 1 thereon, a recording and reproducing head drum 7, guide rollers 10 and 11 installed to move along guide grooves 8 and 9 so that a tape 4 is pulled out of the loaded tape cassette 1 and pressed against the head drum 7, a capstan 12 and a pinch roller 13 for transferring the tape at a constant speed, and tape guides 14 and 15 for guiding the tape 4. In addition, in order to selectively drive the reel driving tables 5 and 6 with a capstan motor 16 and thereby to wind the tape 4 on one of the tape reels 2 and 3, a transmission gear member 17 gear-connected to the capstan motor 16, a belt 18, a driving gear member 19, and an idler 20 are provided. The idler 20 moves according to the rotational direction of the driving gear member 19, engaging with the driving gear member 19. The pair of reel driving tables 5 and 6 have reel gears 21 and 22, respectively, which engage with the idler 20. In this case, in general, the reel gears 21 and 22 can race with respect to the reel driving tables 5 and 6, respectively, according to the tension in the tape. This is done to prevent the pair of tape reels 2 and 3 from excessively releasing or winding the tape, while the tape 4 is constantly being transferred by the capstan 12 and the pinch roller 13.

FIG. 1 illustrates the state where a tape is transferred at a normal or low speed during a playback or slow search mode. Meanwhile, a rewind, fast forward, or fast search is performed by releasing the pinch roller 13 from the pressure of the capstan 12 and rotating the capstan motor 16 at a high speed. However, when the speed of the capstan motor 16 is increased with the tape in a full loading state with respect to the head drum 7 as shown in FIG. 1, the tape tension is too high. Thus, the reel gears 21 and 22 frequently race, impeding high-speed tape travel and making the tape transfer speed nonconstant. As a result, the picture search cannot be performed reliably. To circumvent this problem, the deck mechanism is switched to a mode in which the tape is unloaded, or to a half-loading state in which the tape 4 lightly contacts the head drum 7 (see FIG. 2), so as to travel the tape stably and rapidly.

However, the deck mechanism for the tape half loading is difficult to design, the waiting period for switching to the tape unloading or half loading state is too long, and frequent switching may damage the tape.

A clutching means for driving reel driving tables by increasing a driving torque from a capstan motor during a rapid tape travelling is disclosed in U.S. Pat. Nos. 5,230,483 and 5,251,845. Such clutching means solves the above racing problem and thus enables a tape to rapidly travel in a full loading state. However, many parts are required to realize the clutching means, its assembly is difficult, and the required axial movement of the several gear members becomes an obstacle to designing a slim deck mechanism.

SUMMARY OF THE INVENTION

An object of the present invention is to provide a reel driving device having a simple structure which can transfer a fully loaded tape at high speed.

To achieve the above object, there is provided a tape reel driving device for selectively driving a pair of reel driving tables on which a pair of reels of a tape cassette are seated, comprising: first reel gears respectively combined with the reel driving tables so that each of the first reel gears and a corresponding one of the reel driving tables rotate together; second reel gears respectively combined with the reel driving tables so that each of the second reel gears rotates by a predetermined frictional force together with a corresponding one of the reel driving tables, each of the second reel gears being capable of racing; a first idler movably supported to be selectively connected to either one of the first reel gears of the pair of reel driving tables; a second idler movably supported to be selectively connected to either one of the second reel gears of the pair of reel driving tables; movement preventing means for allowing the movement of one of the first and second idlers while preventing the other of said first and second idlers from moving; a motor for generating power; and a driving gear member which is rotated by the motor and which selectively drives the first and second reel gears through one of the first and second idlers.

In the present invention, the transmission gear pulley and the belt, which connect the capstan motor to the driving gear pulley, may be used to drive the driving gear member by the driving source of the capstan unit. Further, the movement preventing means is of a cam interlock structure using the loading motor usually installed in a deck mechanism and a main slide member for switching modes, thereby obviating the need for an additional motor. Thus, the present invention can be simplified.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1:
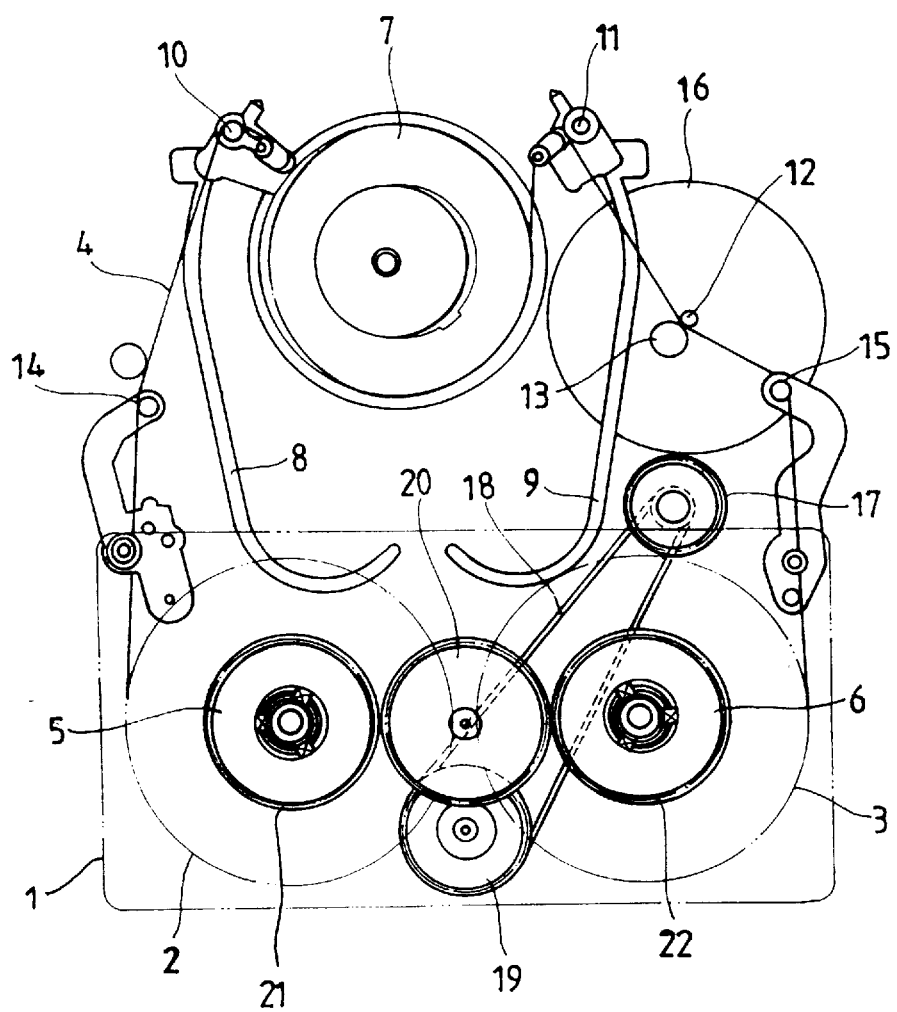
FIG. 1 is a plan view of a deck mechanism for a tape recorder employing a conventional tape reel driving device, in a fully loaded state.
Figure 2:
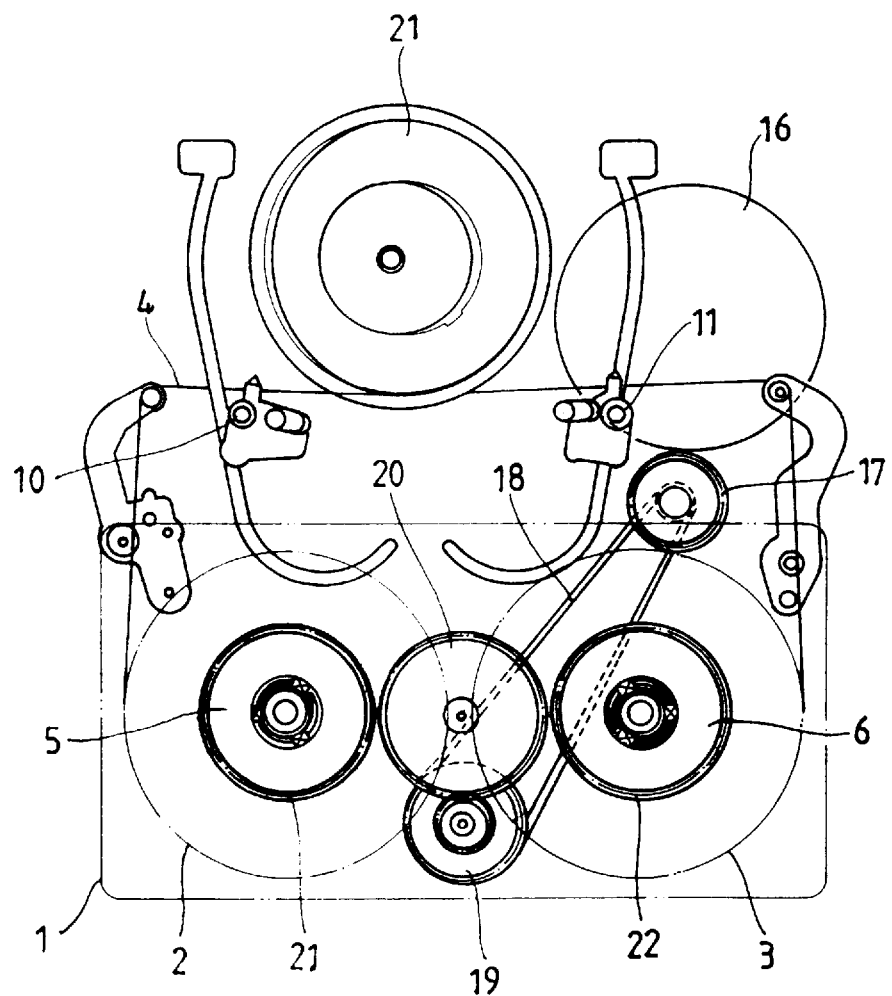
FIG. 2 is a plan view of the deck mechanism for a tape recorder employing the conventional tape reel driving device, in a partially loaded state.
Figure 3:
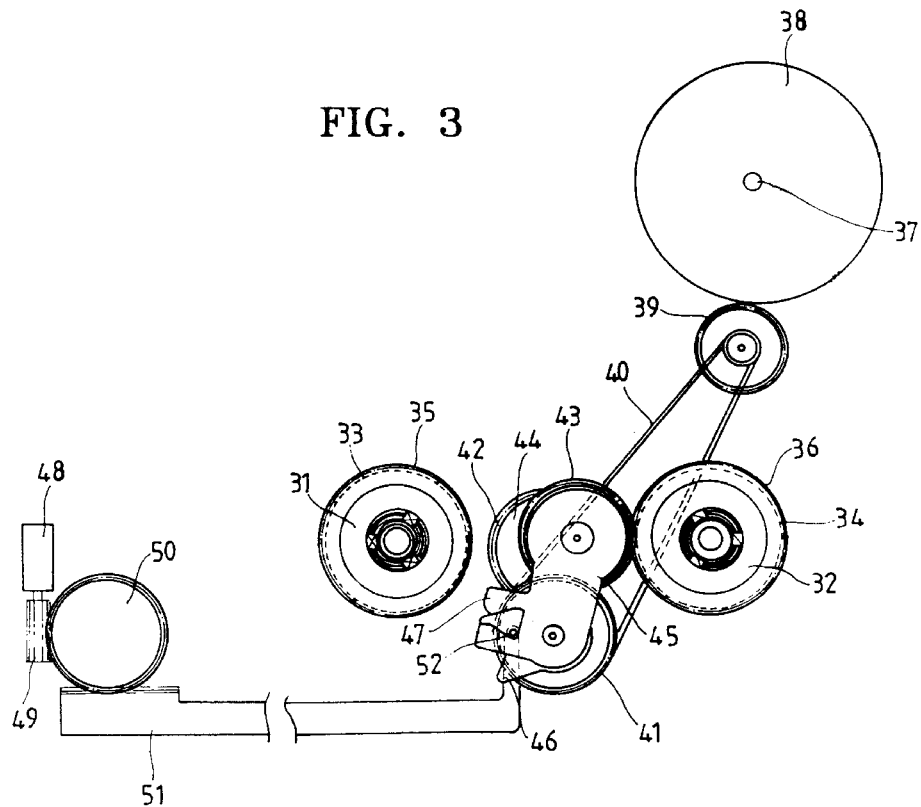
FIG. 3 is a plan view of a tape reel driving device according to the present invention.

As shown in FIG. 3, a reel driving device of the present invention is comprised of a pair of reel driving tables 31 and 32 for placing tape reels of a tape cassette thereon, first and second reel gears 33 (34) and 35 (36) combined with the reel driving table 31 (32), a capstan 37, and a capstan motor 38 for driving the capstan 37. A driving gear member 41 is disposed between the reel driving tables 31 and 32 and is rotated by the capstan motor 38 via a transmission gear member 39 and a belt 40. First and second idlers 42 and 43 are gear-connected to the driving gear member 41. First and second cam plates 44 and 45 having cam interlocking portions 46 and 47, respectively, and rotatably coupled to a shaft of the driving gear member 41, are provided for pivot-supporting the first and second idlers 42 and 43. A loading motor 48 is provided for generating power to switch the state of each portion of a deck mechanism as well as to load a tape cassette and a tape, and a main slide member 51 is moved by the loading motor 48 via a worm gear 49 and a master gear 50 and includes a cam interlocking pin 52 for interlocking the cam interlocking portions 46 and 47 according to the movement of the main slide member 51.

Figure 4:
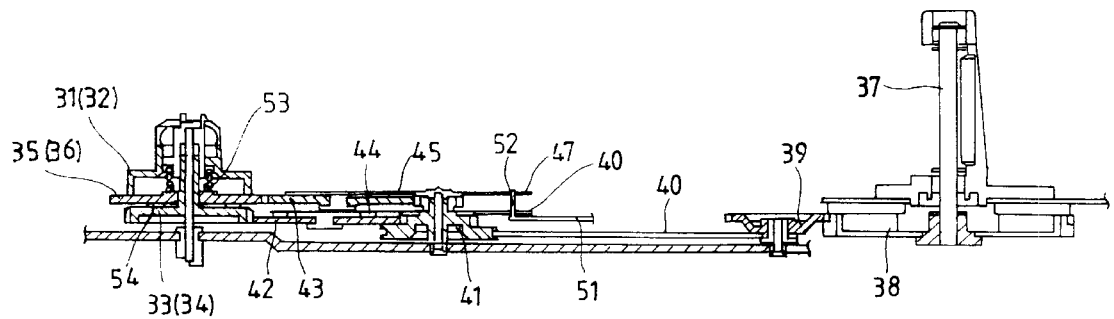
FIG. 4 is a sectional view of some connected components of the tape reel driving device shown in FIG. 3.

Referring to FIG. 4, the first reel gear 33 (34) is combined with the reel driving table 31 (32) so that they rotate together. The lower surface of the second reel gear 35 (36) is combined with the upper surface of the first reel gear 33 (34) via a felt member 54 by being pressed by a spring 53. The spring 53 is situated between the second reel gear 35 (36) and the reel driving table 31 (32) and the felt member 54 is between the second reel gear 35 (36) and the first reel gear 33 (34). The second reel gears 35 (36) rotate together with the first reel gears 33 (34) by a predetermined frictional force of the felt member 54, and if a larger load than the frictional force is applied to the reel driving tables 31 (32), the second reel gears 35 (36) race (i.e., freewheel).

Figure 5:
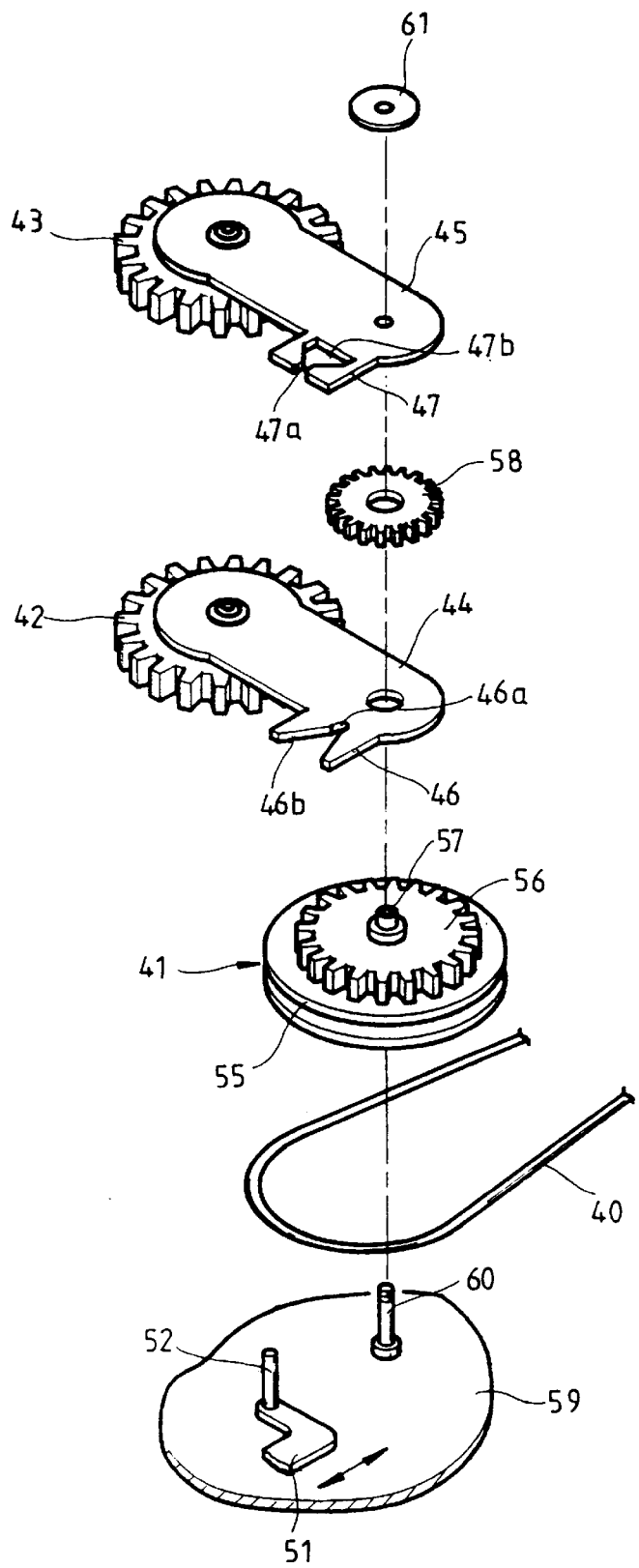
FIG. 5 is an exploded perspective view of an important portion of the tape reel driving device shown in FIG. 3.

Referring to FIG. 5, the driving gear member 41 has a pulley 55 on which the belt 40 is engaged, a first gear 56, and a second gear 58 to fit with a boss 57 protruding from the first gear 56. The driving gear member 41 is installed to rotate around a shaft 60 fixed on a deck 59. The first cam plate 44 is rotatably coupled to the boss 57 between the first gear 56 and the second gear 58. The second cam plate 45 is also rotatably coupled to the upper end portion of the shaft 60 passing through the boss 57. Here, the first idler 42 pivot-supported by the first cam plate 44 is gear-connected to the first gear 56, and the second idler 43 pivot-supported by the second cam plate 45 is gear-connected to the second gear 58. As shown, the cam interlocking portions 46 and 47 of the first and second cam plates 44 and 45 have narrow cam portions 46a and 47a and wide cam portions 46b and 47b, respectively. The cam portions 46a and 46b of the first cam plate 44 are disposed to correspond to the cam portions 47b and 47a of the second cam plate 45, respectively. That is, when the cam interlocking pin 52 of the main slide member 51 is positioned at the wide cam portion 46b of the cam interlocking portion 46 and the narrow cam portion 47a of the cam interlocking portion 47 according to the movement of the slide member 51, the first idler 42 supported by the first cam plate 44 is allowed to move, while the second idler 43 is kept from moving. On the other hand, when the cam interlocking pin 52 is positioned at the narrow cam portion 46a of the cam interlocking portion 46 and the wide cam portion 47b of the cam interlocking portion 47, the first idler 42 is prevented from moving, while the second idler 43 is allowed to move. Reference numeral 61 in FIG. 5 denotes a stop ring for preventing the deviation of the members supported by the shaft 60.

Figure 6:
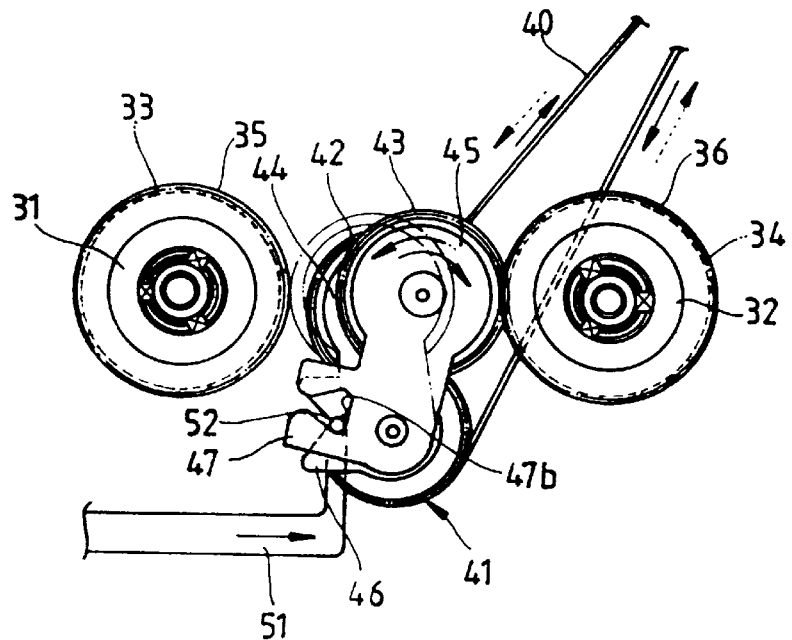
FIG. 6 is a plan view of the tape reel driving device of the present invention for a low-speed tape travel.
Figure 7:
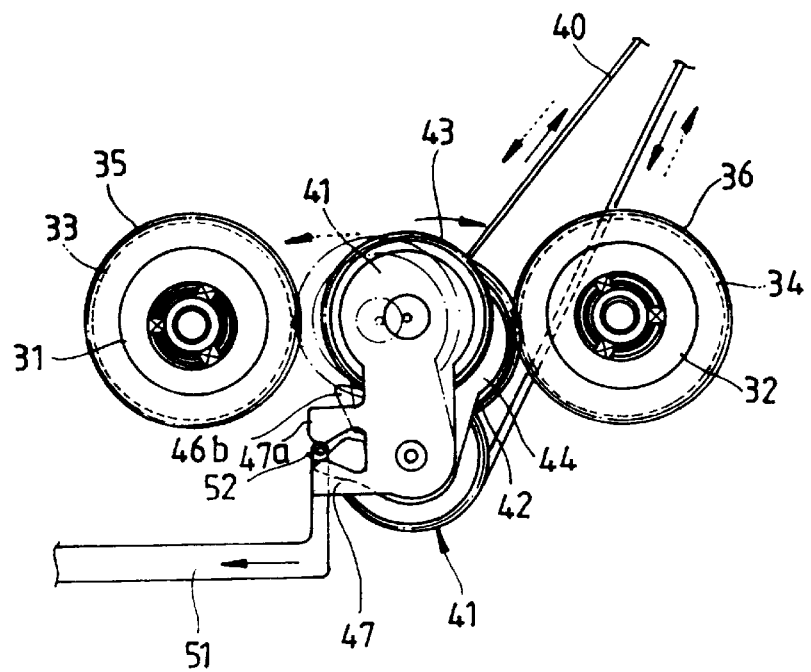
FIG. 7 is a plan view of the tape reel driving device of the present invention for a high-speed tape travel.

Referring to FIGS. 6 and 7, the mechanism in the cases of low-speed (FIG. 6) and high-speed operations (FIG. 7), in the reel driving device of the present invention will be described.

FIG. 6 illustrates the performance of, for example, a playback mode or a slow-picture search mode. In this case, the cam interlocking pin 52 of the main slide member 51 is positioned at the narrow cam groove 46a of the cam interlocking portion 46 of the first cam plate 44 and at the wide cam groove 47b of the cam interlocking portion 47 of the second cam plate 45 shown in FIG. 5. Therefore, the first idler 42 supported by the first cam plate 44 is kept at a neutral position, prevented from moving, while the second idler 43 is allowed to move to the left or right according to the rotating direction of the aforementioned capstan motor 38. For instance, when the capstan motor 38 rotates clockwise for the playback mode, the belt 40 and the driving gear member 41 rotate clockwise as indicated by the solid arrows in FIG. 6. Thus, the first idler 42 connected to the first gear 56 of the driving gear member 41 races at the neutral position, and the second idler 43 connected to the second gear 58 moves to the right and is connected to the second reel gear 36 of the take-up reel table 32, thereby transmitting power thereto. At this time, the reel driving table 32 is driven by the frictional force of the felt member 54 generated by the pressure of the spring 53. In this state, for example, when the capstan motor 38 rotates counterclockwise for a reverse-playback mode, the first idler 42 remains at the neutral position and the second idler 43 moves in the direction indicated by dotted arrows in FIG. 6 to the second reel gear 35 of the supply reel driving table 31.

Then, FIG. 7 illustrates the performance of a fast forward mode or a forward high-speed picture search mode. In this case, the cam interlocking pin 52 of the main slide member 51 is positioned at the wide cam groove 46b of the cam interlocking portion 46 of the first cam plate 44 and at the narrow cam groove 47a of the cam interlocking portion 47 of the second cam plate 45 shown in FIG. 5. Therefore, the first idler 42 supported by the first cam plate 44 is allowed to move to the left or right, while the second idler 43 is kept at a neutral position, prevented from moving. For example, when the capstan motor rotates clockwise for the fast forward mode, the belt 40 and the driving gear member 41 rotate clockwise in the direction indicated by the solid arrows in FIG. 7. Thus, the first idler 42 connected to the first gear 56 of the driving gear member 41 moves to the right, and is connected to the first reel gear 34 of the take-up reel driving table 32, thereby transmitting power thereto. At this time, the second idler 43 connected to the second gear 58 races at the neutral position. Therefore, the reel driving table 32 operates at a high speed without slippage from the first reel gear 34. In this state, when the capstan motor rotates counterclockwise, for example, for a reverse mode, the first idler 42 moves in the direction indicated by the dotted arrows in FIG. 7 to the first reel gear 33 of the supply reel driving table 31. Here, the second idler 43 remains at the neutral position.

As described above, in the present invention, a driving torque is varied by selectively moving two idlers according to a mode, and a tape can be traveled rapidly, being fully loaded, without setting a deck mechanism to an unloading or partial loading state. Thus, the deck mechanism is easy to design, simplified, and lightweight, thereby improving the assembly procedure and satisfying the demand for a slim product.

The present invention is not restricted to the above embodiment, and it is clearly understood that many variations are possible within the spirit and scope of the present invention by anyone skilled in the art.

What is claimed is:

1. A tape reel driving device for selectively driving a pair of reel driving tables on which a pair of reels of a tape cassette are seated, comprising:

first reel gears respectively combined with and coaxial with said reel driving tables so that each of said first reel gears and a corresponding one of said reel driving tables rotate together;

second reel gears respectively combined with and coaxial with said reel driving tables so that each of said second reel gears rotates by a predetermined frictional force together with a corresponding one of said reel driving tables, each of said second reel gears being capable of racing when a larger load than the predetermined frictional force is applied to said corresponding one of said reel driving tables;

a first idler movably supported to be selectively connected to either one of said first reel gears of said pair of reel driving tables;

a second idler movably supported to be selectively connected to either one of said second reel gears of said pair of reel driving tables;

movement preventing means for allowing the movement of one of said first and second idlers while preventing the other of said first and second idlers from moving;

a motor for generating power; and a driving gear member which is rotated by said motor and which selectively drives said first and second reel gears through one of said first and second idlers.

2. The tape reel driving device as claimed in claim 1, further comprising a felt member disposed between said first and second reel gears of each reel driving table, and a spring for elastically biasing said second reel gear toward said first reel gear, so that said first and second reel gears rotate together by a frictional force of said felt member caused by the biasing of said spring.

3. The tape reel driving device as claimed in claim 1, wherein said movement preventing means comprises a loading motor, a slide member having an interlocking pin and operative to move by said loading motor, and first and second cam plates each having a cam interlocking portion interlocked by said interlocking pin, supported to make a pivot-movement, and selectively prevented from the pivot-movement according to the movement of said interlocking pin,. wherein said first and second idlers are supported by said first and second cam plates, respectively.

4. The tape reel driving device as claimed in claim 3, wherein said first and second cam plates each have mutually communicating narrow and wide cam grooves, and said narrow and wide cam grooves of said first cam plate are positioned corresponding to said wide and narrow cam grooves of said second cam plate, respectively.

5. The tape reel driving device as claimed in claim 3, wherein said first and second cam plates are pivotally supported by a common shaft.

6. The tape reel driving device as claimed in claim 4, wherein said first and second cam plates are pivotally supported by a common shaft.

7. The tape reel driving device as claimed in claim 1, wherein said driving gear member comprises first and second gears which are supported by a common shaft and combined with each other to rotate together, wherein said first and second idlers are gear-connected to said first and second gears, respectively, and supported by first and second cam plates which are supported by the common shaft of said driving gear member to make a pivot-movement, respectively.

8. The tape reel driving device as claimed in claim 1, wherein said driving gear member is driven by a transmission gear member driven by said motor, and a belt for connecting said transmission gear member to said driving gear member.

9. The tape reel driving device as claimed in claim 8, wherein said motor is a capstan motor to drive a capstan for transferring a tape.

10. The tape reel driving device as claimed in claim 1, wherein said motor is a capstan motor to drive a capstan for transferring a tape.

11. A tape reel driving device for selectively driving a pair of reel driving tables on which a pair of reels of a tape cassette are seated, comprising:

first reel gears respectively combined with said reel driving tables so that each of said first reel gears and a corresponding one of said reel driving tables rotate together;

second reel gears respectively combined with said reel driving tables so that each of said second reel gears rotates by a predetermined frictional force together with a corresponding one of said reel driving tables, each of said second reel gears being capable of racing;

a first idler movably supported to be selectively connected to either one of said second reel gears of said pair of reel driving tables;

a second idler movably supported to be selectively connected to either one of said second reel gears of said pair of reel driving tables;

a movement preventing mechanism comprising a loading motor, a slide member having an interlocking pin and operative to move by said loading motor, and first and second cam plates each having a cam interlocking portion interlocked by said interlocking pin, supported to make a pivot-movement, and selectively prevented from the pivot-movement according to the movement of said interlocking pin, wherein said first and second idlers are supported by said first and second cam plates, respectively, said movement preventing mechanism being operative to allow the movement of one of said first and second idlers while preventing the other of said first and second idlers from moving;

a motor for generating power; and a driving gear member which is rotated by said motor and which selectively drives said first and second reel gears through one of said first and second idlers.

12. The tape reel driving device as claimed in claim 11, wherein said first and second cam plates each have mutually communicating narrow and wide cam grooves, and said narrow and wide cam grooves of said first cam plate are positioned corresponding to said wide and narrow cam grooves of said second cam plate, respectively.

13. The tape reel driving device as claimed in claim 11, wherein said first and second cam plates are pivotally supported by a common shaft.

14. A tape reel driving device for selectively driving a pair of reel driving tables on which a pair of reels of a tape cassette are seated, comprising:

first reel gears respectively combined with said reel driving tables so that each of said first reel gears and a corresponding one of said reel driving tables rotate together;

second reel gears respectively combined with said reel driving tables so that each of said second reel gears rotates by a predetermined frictional force together with a corresponding one of said reel driving tables, each of said second reel gears being capable of racing;

a first idler movably supported to be selectively connected to either one of said first reel gears of said pair of reel driving tables;

a second idler movably supported to be selectively connected to either one of said second reel gears of said pair of reel driving tables;

a movement preventing mechanism which allows the movement of one of said first and second idlers while preventing the other of said first and second idlers from moving;

a motor for generating power; and a driving gear member which is rotated by said motor and which selectively drives said first and second reel gears through one of said first and second idlers, wherein said driving gear member comprises first and second gears which are supported by a common shaft and combined with each other to rotate together, wherein said first and second idlers are gear-connected to said first and second gears, respectively, and supported by first and second cam plates which are supported by the common shaft of said driving gear member to make a pivot-movement, respectively.

* * * * *